United States Patent [19]
Descroix et al.

[11] Patent Number: 4,734,341
[45] Date of Patent: Mar. 29, 1988

[54] ELECTROCHEMICAL GENERATOR WITH LITHIUM ANODE AND LIQUID CATHODE

[75] Inventors: Jean-Pierre Descroix, Fontenay Sous Bois; Jean-Luc Firmin, Poitiers; Jean-Pierre Planchat, Saint Benoit, all of France

[73] Assignee: Saft, S.A., Romainville, France

[21] Appl. No.: 24,705

[22] Filed: Mar. 11, 1987

[30] Foreign Application Priority Data

Dec. 12, 1986 [FR] France .................. 86 17426

[51] Int. Cl.$^4$ .......................................... H01M 10/50
[52] U.S. Cl. ...................... 429/62; 429/101; 429/152; 429/160; 429/194
[58] Field of Search ............ 429/152, 153, 154, 155, 429/101, 160, 66, 162, 61, 62, 194

[56] References Cited

U.S. PATENT DOCUMENTS

| | | | |
|---|---|---|---|
| 4,283,470 | 8/1981 | Freeman et al. | 429/153 X |
| 4,287,273 | 9/1981 | Harney et al. | 429/153 |
| 4,539,268 | 9/1985 | Rowlette | 429/152 X |
| 4,603,093 | 7/1986 | Edwards et al. | 429/160 X |

FOREIGN PATENT DOCUMENTS 2539917 1/1983 France .

*Primary Examiner*—Anthony Skapars
*Attorney, Agent, or Firm*—Kenyon & Kenyon

[57] ABSTRACT

The present invention concerns an electrochemical generator with a lithium anode and liquid cathode and, notably, generators using the Li/SO$_2$, Li/SOCl$_2$ and Li/SO$_2$Cl$_2$ couples. This generator comprises of stack of flat elements threaded onto rods, one end of each rod being attached to the cover of a case. The anodes are threaded by flexible lugs which act as current collectors and fuses.

7 Claims, 6 Drawing Figures

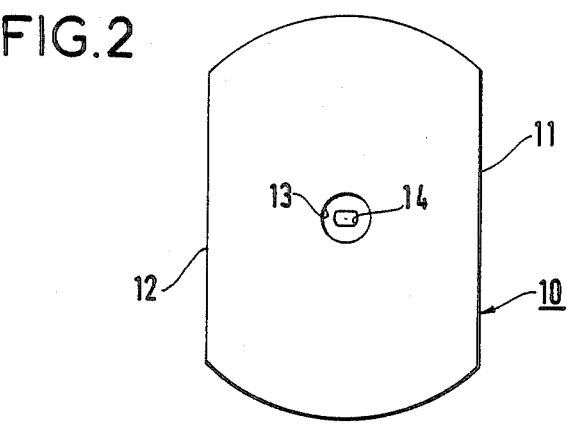
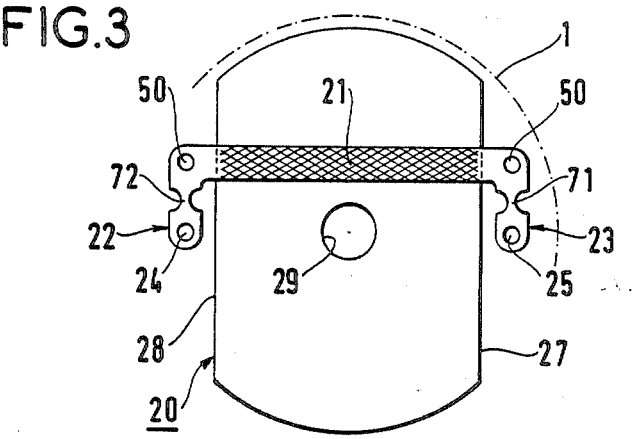
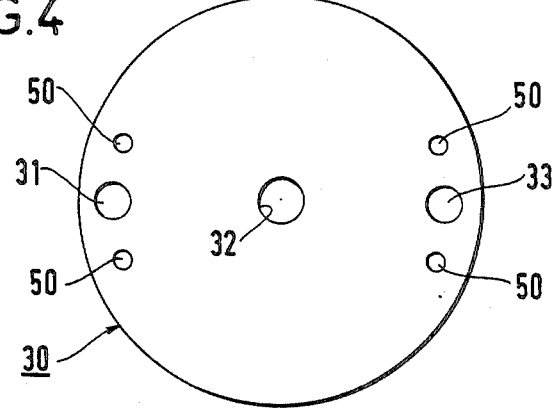

ELECTROCHEMICAL GENERATOR WITH LITHIUM ANODE AND LIQUID CATHODE

The present invention relates to an electrochemical generator with a lithium anode and a liquid cathode and notably generators exploiting $Li/So_2$, $Li/SOCl_2$ and $Li/So_2Cl_2$ couples.

The French Pat. No. 2 539 917 of Jan. 21 1983 relates to an electrochemical generator consisting of a stack of flat elements enclosed in a case, each element comprising separators and electrodes fitted with a metal collector plate, each electrode presenting at least two openings whereby it is threaded to respectively at least two parallel metal rods with intercalated metal spacing rings to maintain the desired interval between the plates and to ensure electrical connection between the corresponding electrodes. The entire unit is maintained compressed between two end flanges, the ends of the rods being fitted with washers supported by these flanges.

Lithium/halide batteries with the preceding structure are designed for high-capacity supply (for example, more than 50 amperes/hour) and are capable of accepting high discharge rates (for example, one discharge in one hour). These batteries may be very dangerous in the event of an explosion due to abnormal running causing an excessive increase in battery temperature. The causes of this phenomenon may notably be a short-circuit within or outside the battery, or poor evacuation of heat generated during discharge.

The aim of the present invention is to provide a battery the structure of which is such that the risk of internal short-circuit is reduced, the consequences of internal or external short-circuit are limited, and heat dissipation is promoted.

The object of the present invention is to provide an electrochemical generator with a lithium anode and liquid cathode, consisting of a stack of flat elements enclosed in a case, each element comprising separators and electrodes fitted with a metal collector plate, each electrode presenting at least two openings whereby it is threaded to respectively at least two parallel metal tie-rods with metal spacers to maintain the desired interval between the plates and to ensure the electrical connection between the corresponding electrodes, wherein the first of the said metal rods connected to electrodes of the first polarity traverses the totality of the said stack, at least one electrolyte reserve capsule being disposed as a function of height of the stack between the latter and the said case, current collector lugs emerging in this capsule, the said lugs being threaded onto the second of the said metal rods and belonging to the collector plates of the electrodes of the second polarity, one end of the said rods being rigidly attached to one of the far faces of the said case, the other end being allowed free motion within the said case.

The structure thus obtained is sufficiently rigid to resist vibration but, should there be an increase in temperature, presents a much lower explosion risk than previous structures. Indeed, the use of rods fixed rigidly at a single end, at least one moreover being threaded to relatively flexible lugs, allows the constraints likely to be manifest within the electrodes themselves in the event of heating to be minimized. Consequently, the risk of an internal short circuit is considerably reduced. Furthermore, the electrolyte reserve(s) in the lateral capsules, in which the separators may emerge, thus acting as wicks, allow(s) drying of the couples at the end of discharge to be avoided, and therewith the creation of dangerous melting points.

According to a preferential embodiment, the first metal rod traverses the stack center and is connected to the cathode plates; moreover, the lithium electrodes possess two nickel current collector lugs emerging in two lateral electrolyte capsules and being respectively threaded to two negative rods.

According to a particularly advantageous embodiment, the said current collector lugs are designed to constitute fuses and, in the event of accidental short circuit, prevent the disagreeable consequences of such a short circuit.

Preferably there are highly precise additional holes in the electrodes and separators to allow optimal stacking of the said elements on the assembly rods to avoid all internal short circuits.

Other features and advantages of the present invention will appear in the course of the following description of one embodiment given for purposes of illustration, but which is in no way exhaustive.

In the appended drawing:

FIG. 2 shows a schematic elevation of a cathode belonging to the battery shown in FIG. 1.

FIG. 3 is a schematic elevation of an anode belonging to the battery of FIG. 1.

FIG. 4 shows a schematic elevation of a separator belonging to the battery of FIG. 1.

Figure 1:
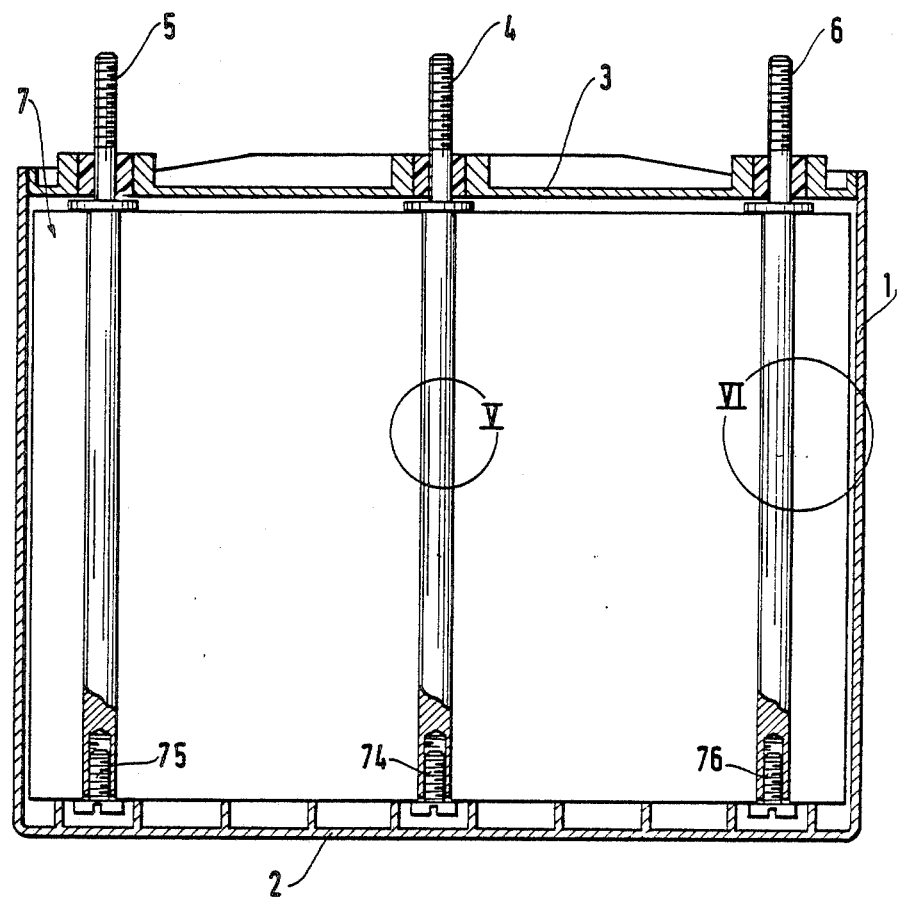
FIG. 1 shows a partial highly schematic cross-section of a battery according to the invention.

The battery which will now be described has a stack consisting of forty-one anodes like that depicted in FIG. 3, and forty cathodes like that depicted in FIG. 2, with interposed separators like that depicted in FIG. 4.

These flat constituents are assembled, as will be explained below in detail, such that electrochemical block 7 is formed in cylindrical case 1 depicted in FIG. 1, fitted with base 2 and cover 3, thanks to the use of central rod 4 forming a positive terminal and two lateral rods 5 and 6 forming two negative terminals; these rods are about 4 mm in diameter. A cathode 10, depicted in FIG. 2, comprises an electroformed nickel grid of approximately 100 micron thickness, the faces of which are coated with polytetrafluorethylene-bound acetylene black. This cathode presents a circular perimeter of diameter 100 mm with two chordal edges 11 and 12.

An opening 14 of diameter 4.2 mm is provided at the center of cathode 10 for the passage of central rod 4, each face of the nickel grid around this opening remaining uncoated to form ring 13 of external diameter 11 mm.

The passages for negative rods 5 and 6 are disposed in the respective spaces between edges 11 and 12 and the base, the width between these edges being 68 mm.

The thickness of a cathode 10 is approximately 1.1 mm.

A positive electrode 20 shown in FIG. 3 is formed of a lithium sheet in which is embedded a grid-like nickel plate 21, the perpendicular ends 22 and 23 of which are made of solid metal and bear holes 24 and 25 for the passage of rods 5 and 6.

One variant differs in that the positive electrode may be formed of two lithium sheets with an interposed nickel grid.

The general form of this positive electrode 20 is the same as that of cathode 10, i.e. with a circular perimeter of diameter 100 mm and two chordal edges 27 and 28 spaced 68 mm apart. In the center is hole 29 of diameter 12.2 mm for the passage or rod 4. The thickness of this electrode 20 is approximately 0.38 mm.

The separators interposed between electrodes 10 and 20 are depicted in FIG. 4. Each separator 30 is in the shape of a disk of diameter 102 mm with three orifices 31, 32 and 33 disposed on a diameter of the separator so as to allow the passage of rods 4, 5 and 6.

Each separator is preferably comprised of two superposed layers: a mechanically resistant layer of varnished glass fabric, and a microporous layer designed to stop fine particles, and made of felted glass fiber. The thickness of a separator 30 is approximately 0.16 mm.

Cover 3 of case 1, fitted with rods 4, 5 and 6, is used as an assembly plate for stacking all the battery constituents. A feature for assembly is the addition of mounting rods (not depicted) to be inserted into the openings 50 in negative electrodes 20 and separators 30, depicted in FIGS. 3 and 4. These rods are removed upon completion of assembly and once electrochemical block 7 has been constituted.

Figure 5:
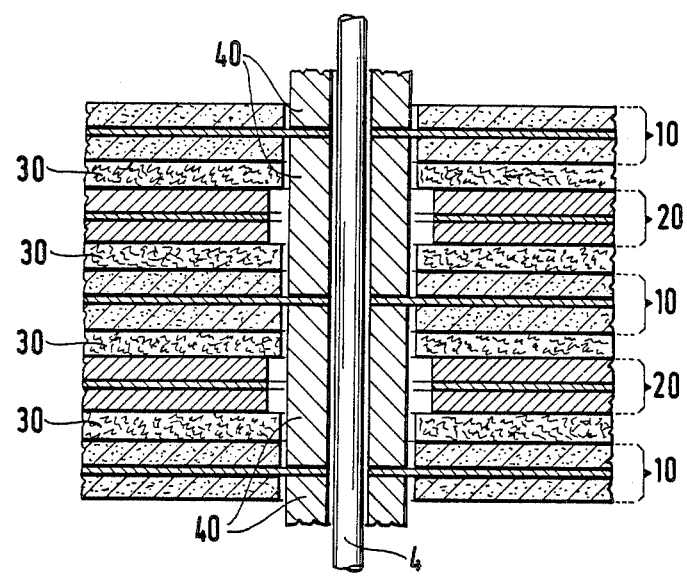
FIG. 5 shows an enlarged cross section of a detail bearing the reference V in FIG. 1.

FIG. 5 shows in enlarged detail how stacking is arranged in region V of FIG. 1. A cathode 10, a separator 30, a negative electrode 20, a separator 30, a cathode 10, and so on, are successively threaded onto positive rod 4. The central holes 29 of the negative electrodes 20 are sufficiently wide not to be in contact with the positive polarity. Cylindrical metal spacers 40 are threaded onto rod 4 to ensure correct spacing and establish electrical contact between two electrodes 10. These spacers are disposed such that they are supported by the nickel grid of the electrodes 10 in the area of the annular zone 13 depicted in FIG. 2.

Figure 6:
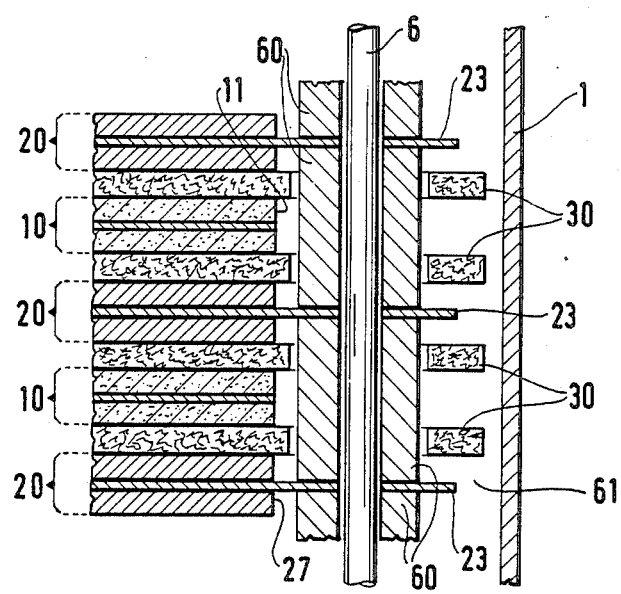
FIG. 6 shows an enlarged cross section of a detail bearing the reference VI in FIG. 1.

FIG. 6 shows in enlarged detail how stacking is arranged in region VI of FIG. 1, near the periphery of electrochemical block 7. The negative rod 6 traverses negative electrodes 20 through openings 25 in current collector lug 23, with metal spacers 60 analogous to spacers 40; proper spacing between the negative electrodes 20, together with their electrical interconnection, is thus ensured.

The spacer between chordal edges 11 and 27 of the electrodes and the internal wall of case 1 defines a compartment 61 which serves as an electrolyte reservoir and in which are immersed the edges of separators 30, which act as wicks to prevent drying of the lithium electrodes 20 during discharge.

By way of example, the electrolyte consists of a solvent selected from $SO_2$, $SOCl_2$, $SO_2Cl_2$, and with $LiAlCl_4$ as solute.

When all elements are threaded onto rods 4, 5 and 6, screws 74, 75 and 76 secure the entire electrochemical block 7, but nothing rigidly attaches the lower part of the block to the walls of case 1 or its base 2. Flexibility of the current collector lugs thus can absorb deformations in the cover or case which might appear during operation and engender short circuits.

According to a very important feature of the present invention, depicted in FIG. 3, the current collector lugs 22 and 23 of each negative electrode 20 have necked regions 71, 72 having a width of for example 0.6 mm for a thickness of 0.08 mm. This necking provides the lug with a fuse function which acts in the event of an internal or external battery short circuit. In a specific example, where normal current passing in each electrode is approximately 1 ampere, the short circuit current may exceed 50 amperes; the necking is selected such that the affected couple is isolated if current exceeds 5 amperes, and thus to avoid the severe consequences of a short circuit.

Obviously, the invention is not limited to the embodiment just described. A battery consisting of one positive rod and two negative rods has been shown, but it is also possible to envisage one rod for each polarity.

We claim:

1. Electrochemical generator with a lithium anode and a liquid cathode consisting of a stack of flat elements enclosed in a case, each element comprising separators and electrodes fitted with a metal collector plate, each electrode presenting at least two openings whereby it is threaded to respectively at least two parallel metal rods with metal spacers to maintain the desired interval between the plates and to ensure electrical connection between the corresponding electrodes, wherein a first of the said metal rods connected to electrodes of a first polarity totally traverses the said stack, at least one electrolyte reserve compartment being disposed as a function of height of the stack between the latter and the said case, current collector lugs emerging in this compartment, said current collector lugs comprising a neck that constitutes a fuse, the said current collector lugs being threaded onto the second of the said metal rods and belonging to collector plates of electrodes of a second polarity, and one end of each of the said rods being rigidly attached to an end wall of the said case, the other end of each of said rods being allowed free motion within the said case.

2. Electrochemical generator according to claim 1, wherein the said first of the said metal rods traverses the said stack clearly at the center of the electrodes and constitutes the positive terminal, whereas two rods constituting two negative terminals are situated respectively in two lateral compartments forming electrolyte reserves.

3. Electrochemical generator according to one of claims 1 or 2, wherein edges of the said separators emerge in the said electrolyte reserve compartments and function as wicks.

4. Electrochemical generator according to claim 1 or 2, wherein the said separators and the said current collector lugs present openings designed to receive guide rods for assembly.

5. Electrochemical generator according to claim 1 or 2, wherein said electrodes of said first polarity are negative, each negative electrode comprises at least one lithium sheet and one nickel grid acting as current collector, equipped with the said current collector lugs at two ends.

6. Electrochemical generator according to claim 1 or 2, wherein each cathode comprises a nickel grid, the faces of which are coated with acetylene black.

7. Electrochemical generator according to claim 1 or 2, wherein each separator is formed of a varnished glass fabric layer associated with a layer of felted glass fiber.

* * * * *